United States Patent
Saxena et al.

(10) Patent No.: US 9,980,105 B2
(45) Date of Patent: May 22, 2018

(54) MOBILE COMMUNICATIONS DEVICE AND A METHOD FOR CONTROLLING A MOBILE COMMUNICATIONS DEVICE

(71) Applicant: Intel IP Corporation, Santa Clara, CA (US)

(72) Inventors: Alok Saxena, Bangalore (IN); Rishav Dev, Bangalore (IN)

(73) Assignee: INTEL IP CORPORATION, Santa Clara, CA (US)

( * ) Notice: Subject to any disclaimer, the term of this patent is extended or adjusted under 35 U.S.C. 154(b) by 64 days.

(21) Appl. No.: 14/864,883

(22) Filed: Sep. 25, 2015

(65) Prior Publication Data

US 2017/0094485 A1 Mar. 30, 2017

(51) Int. Cl.
| | |
|---|---|
| H04W 4/14 | (2009.01) |
| H04L 12/24 | (2006.01) |
| H04L 29/06 | (2006.01) |
| H04W 76/04 | (2009.01) |
| H04W 76/06 | (2009.01) |
| H04W 68/00 | (2009.01) |
| H04W 88/06 | (2009.01) |

(52) U.S. Cl.
CPC .......... *H04W 4/14* (2013.01); *H04L 41/0813* (2013.01); *H04L 65/1016* (2013.01); *H04W 68/00* (2013.01); *H04W 76/04* (2013.01); *H04W 76/06* (2013.01); *H04W 88/06* (2013.01)

(58) Field of Classification Search
CPC ..... H04W 88/06; H04W 48/18; H04W 68/00; H04L 12/1881
See application file for complete search history.

(56) References Cited

U.S. PATENT DOCUMENTS

| | | | | |
|---|---|---|---|---|
| 2010/0304782 | A1* | 12/2010 | Chang | H04W 8/183 455/552.1 |
| 2011/0003590 | A1* | 1/2011 | Yoon | H04W 36/385 455/432.1 |
| 2011/0064052 | A1* | 3/2011 | Lee | H04W 36/0022 370/331 |
| 2012/0172029 | A1* | 7/2012 | Lai | H04W 68/00 455/422.1 |
| 2012/0218889 | A1* | 8/2012 | Watfa | H04W 60/04 370/230 |

(Continued)

FOREIGN PATENT DOCUMENTS

| | | |
|---|---|---|
| EP | 2512195 A1 | 10/2012 |
| EP | 2642807 A1 | 9/2013 |

OTHER PUBLICATIONS

European Search Report based on Application No. 16185144.9 (6 pages) dated Jan. 17, 2017 (Reference Purpose Only).

*Primary Examiner* — Matthew C Sams
(74) *Attorney, Agent, or Firm* — Viering, Jentschura & Partner mbB

(57) ABSTRACT

A mobile communications device and a method for controlling a mobile communications device including a radio processing circuit and a baseband processing circuit adapted to interact with the radio processing circuit, the mobile communications device configured to: receive a page, obtain message identification information from the page, process the obtained message identification information, and control an ongoing network connection resulting from the processed message identification information.

17 Claims, 5 Drawing Sheets

(56) References Cited

U.S. PATENT DOCUMENTS

| | | | | |
|---|---|---|---|---|
| 2013/0064176 A1* | 3/2013 | Hsu | ........................ | H04W 4/02 370/328 |
| 2013/0303203 A1* | 11/2013 | Wang | .................... | H04W 68/00 455/458 |
| 2015/0009887 A1* | 1/2015 | Chen | ..................... | H04W 48/10 370/312 |
| 2015/0092630 A1* | 4/2015 | Lin | ........................... | H04L 5/14 370/280 |
| 2015/0230226 A1* | 8/2015 | Yoshizawa | .......... | H04W 72/042 370/329 |
| 2017/0079009 A1* | 3/2017 | Saxena | ............... | H04W 72/005 |
| 2017/0094485 A1* | 3/2017 | Saxena | ............... | H04L 41/0813 |

* cited by examiner

MOBILE COMMUNICATIONS DEVICE AND A METHOD FOR CONTROLLING A MOBILE COMMUNICATIONS DEVICE

TECHNICAL FIELD

Various embodiments relate generally to a mobile communications device and a method for controlling the mobile communications device.

BACKGROUND

Dual SIM (subscriber identity module) mobile communication devices have become popular devices in many markets across the world. Many dual SIM UEs support Dual SIM Dual Standby (DSDS) and arbitrate services between the two SIMS in the mobile communications device, which is often constrained by having a single transmission (TX) antenna (which may also be known as a cost-optimized Front End Module and Transceiver implementation). Mobile terminated (MT) circuit switched (CS) services, e.g., adaptive multi-rate (AMR) calls, SMS (short message service), or Location Area updates, in 2G (second generation) or 3G (third generation) radio access technologies (RAT) have priority over MT packet switched (PS) services, e.g., a PS data call. If a CS service is ongoing on one of the SIMs, then PS and CS services for the other SIM are ignored.

It may be advantageous, therefore, to receive an SMS or the caller-ID (identification) from an incoming voice over long term evolution (VoLTE) call intended for the ignored SIM in parallel to a CS call ongoing on one of the SIMs. Furthermore, it may be advantageous to facilitate receiving the SMS or caller-ID by identifying and utilizing information from the paging record, to determine if the ongoing call should be suspended, which helps to prevent the waste of radio resources and even interruption of the ongoing CS call.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
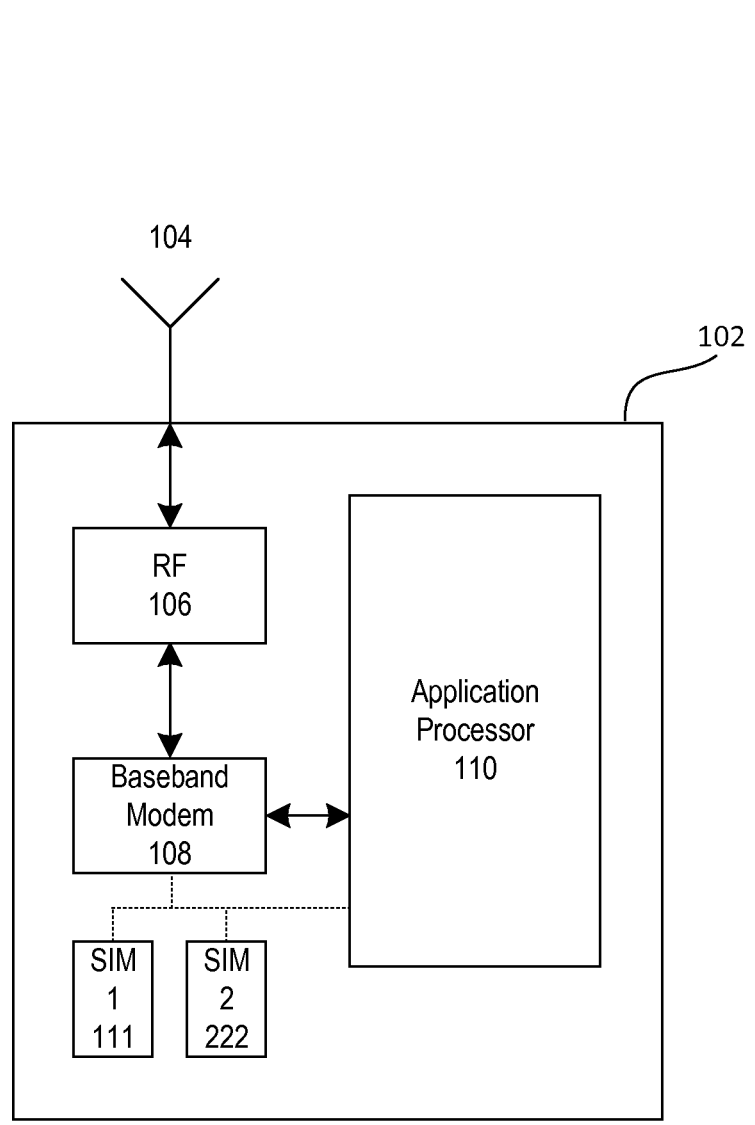
FIG. 1 shows a block diagram illustrating an internal configuration of the mobile communications device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as, for example, Java. Any other kind of implementation of the respective functions which will be described in more detail below may also be understood as a "circuit". It is understood that any two (or more) of the described circuits may be combined into a single circuit with substantially equivalent functionality, and, conversely, that any single described circuit may be distributed into two (or more) separate circuits with substantially equivalent functionality. In particular with respect to the use of "circuitry" in the Claims included herein, the use of "circuit" may be understood as collectively referring to two or more circuits.

A "processing circuit" (or equivalently, "processing circuitry") as used herein, is understood as referring to any circuit that performs an operation(s) on signal(s), such as, e.g., any circuit that performs processing on an electrical signal or an optical signal. A processing circuit may thus refer to any analog or digital circuitry that alters a characteristic or property of an electrical or optical signal, which may include analog data, digital data, or a combination thereof. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g., a processor or microprocessor). As utilized herein, "digital processing circuit(ry)" may refer to a circuit implemented using digital logic that performs processing on a signal, e.g., an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term "memory". It is appreciated that a single component referred to as "memory" or "a memory" may be composed of more than one different type of memory, and thus may refer to a collective component comprising one or more types of memory. It is readily understood that any single memory component may be separate multiple collectively equivalent memory components, and vice versa. Furthermore, it is appreciated that while memory may be depicted, such as in the drawings, as separate from one or more other components, it is understood that memory may be integrated within another component, such as on a common integrated chip.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is to be noted the ensuing description discusses utilization of a mobile communications device under 3GPP (Third Generation Partnership Project) specifications, notably Long Term Evolution (LTE) and Long Term Evolution-Advanced (LTE-A), as well as 2G specifications. Other mobile radio communications systems, however, may be used, where applicable. Some embodiments may be used in conjunction with one or more types of wireless communication signals and/or systems following one or more wireless communication protocols, for example, Radio Frequency (RF), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced (LTE-a), Enhanced Data rates for GSM Evolution (EDGE), or the like. Other embodiments may be used in various other devices, systems, and/or networks. The examples provided herein can apply to other existing, or other not yet formulated standards, so long as they share the underlying features disclosed in the following examples.

FIG. 1 shows a block diagram 100 illustrating an internal configuration of mobile communications device 102 according to an aspect of the disclosure. Mobile communications device 102 may be configured to: receive a page; obtain message identification information (which will be described in detail later, and is illustrated as message identification information 124 in FIG. 3) from the page; process the obtained message identification information; and control an ongoing network connection resulting from the processed message identification information.

As illustrated in FIG. 1, mobile communications device 102 may include antenna 104, radio frequency (RF) transceiver 106, baseband modem 108, application processor 110, first SIM 111, and second SIM 222. As shown in FIG. 1, the aforementioned components of mobile communications device 102 may be implemented as separate components. However, it is to be appreciated the architecture of mobile terminal 102 depicted in FIG. 1 is for explanatory purposes. Therefore, one or more of the aforementioned components of mobile terminal 102 may be integrated into a single equivalent component or divided into two separate components with collective equivalence. It is understood mobile communications device 102 may have one or more additional components, such as additional hardware, software, or firmware elements. For example, mobile terminal 102 may further include various additional components including hardware, firmware, processors, microprocessors, memory, and other specialty or generic hardware, processors, or circuits, etc., in order to support a variety of additional operations. Mobile communications device 102 may also include a variety of user input or output devices (display(s), keypad(s), touchscreen(s), speaker(s), external button(s), camera(s), microphone(s), peripheral device(s), memory, power supply, external device interface(s), subscriber identify module(s) (SIM), etc.).

It is appreciated that the aforementioned components of mobile communications device 102, in particular, RF transceiver 106, baseband modem 108, and application processor 110, may be implemented in a number of different manners, such as by hardware, firmware, software executed on hardware (e.g., a processor), or any combination thereof. Various options include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in an aspect of the disclosure mobile communications device 102 may be a mobile communications device having a radio processing circuit (RF transceiver 106) and a baseband processing circuit (baseband modem 108) adapted to interact with the radio processing circuit. Mobile communications device 102 may be configured to: receive a page; obtain message identification information from the page; process the obtained message identification information; and control an ongoing network connection resulting from the processed message identification information.

In an aspect of the disclosure providing an overview of the operation of mobile communications device 102; mobile communications device 102 may be configured to receive and/or transmit wireless signals according to multiple wireless access protocols or radio access technologies (RATs) that differ, including any one of, or any combination of, LTE (Long Term Evolution), WLAN (wireless local area network), Wi-Fi, UMTS (Universal Mobile Telecommunications System), GSM (Global System for Mobile Communications), Bluetooth, CDMA (Code Division Multiple Access), Wideband CDMA (W-CDMA), etc. The RAT capabilities of mobile communications device 102 may be determined by one or more Subscriber Identity Modules (SIM) included in mobile communications device 102 (which depicts two SIMs, however, three or more SIMs may also be contemplated).

It is to be considered that a first SIM, e.g., first SIM 111, and a second SIM, e.g., second SIM 222, are not limiting in that a particular SIM is always identified as such, i.e., "first and second" is only used for convenience rather than referring to "a SIM" and "the other SIM", if, for example, mobile communications device 102 contains two SIMs. In an aspect of the disclosure, the first SIM 111 may be a multi-RAT SIM, including, e.g., LTE. In another aspect of the disclosure, the second SIM 222 may be a 2G only SIM.

It is appreciated that separate components may be provided for each distinct type of compatible wireless signals, such as a dedicated LTE antenna, RF transceiver, and baseband modem for LTE reception and transmission, and a dedicated 2G antenna, RF transceiver, and baseband modem for 2G reception and transmission. Alternatively, one or more components of mobile communications device 102 may be shared between different wireless access protocols, such as, e.g., by sharing antenna 104 between multiple different wireless access protocols. In an exemplary aspect of the disclosure, RF transceiver 106 and/or baseband modem 108 may be operated according to multiple mobile communication access protocols (i.e., "multi-mode"), and thus may be configured to support one or more of LTE, UMTS, and/or GSM access protocols.

In one aspect of the disclosure, mobile communications device 102 may have at least one transmitter and at least one receiver, e.g., a transceiver. In another aspect of the disclosure, the mobile communications device 102 may have a single transmit antenna, yet have at least one receiver, e.g., two receivers, i.e., mobile communications device 102 may be a cost-optimized Front End Module and Transceiver implementation.

Furthermore, RF transceiver 106 may receive radio frequency wireless signals via antenna 104, which may be implemented as, e.g., a single antenna or an antenna array composed of multiple antennas. RF transceiver 106 may include various reception circuitry elements, which may include, e.g., analog circuitry, configured to process externally received signals; and mixing circuitry, configured to convert externally received RF signals to baseband and/or intermediate frequencies. RF transceiver 106 may also include amplification circuitry to amplify externally received signals, such as power amplifiers (PAs) and/or Low Noise Amplifiers (LNAs), although it is appreciated that such components may also be implemented separately. RF transceiver 106 may additionally include various transmission circuitry elements configured to transmit internally received signals, such as, e.g., baseband and/or intermediate frequency signals provided by baseband modem 108, which may include mixing circuitry to modulate internally received signals onto one or more radio frequency carrier waves and/or amplification circuitry to amplify internally received signals before transmission. RF transceiver 106 may provide such signals to antenna 104 for wireless transmission. Further references herein to reception and/or transmission of wireless signals by mobile terminal 102 may thus be understood as an interaction between antenna 104, RF transceiver 106, and baseband modem 108 as detailed above. Although not explicitly depicted in FIG. 1, RF transceiver 106 may be additionally be connected to application processor 110.

Application processor 110 may be implemented as a Central Processing Unit (CPU), and may function as a controller for mobile terminal 102. Application processor 110 may be configured to execute various applications and/or programs of mobile terminal 102, such as, e.g., applications corresponding to program code stored in a memory component of mobile communications device 102 (not explicitly shown in FIG. 1). Application processor 110 may also be configured to control one or more further components of mobile terminal 102, such as user input/output devices (display(s), keypad(s), touchscreen(s), speaker(s), external button(s), camera(s), microphone(s), etc.), peripheral devices, memory, power supply, external device interfaces, etc.

Although baseband modem 108 and application processor 110 are depicted separately in FIG. 1, it is appreciated that this illustration is not limiting in nature. Accordingly, it is understood that baseband modem 108 and application processor 110 may be implemented separately, implemented together (i.e., as an integrated unit), or partially implemented together.

Figure 2:
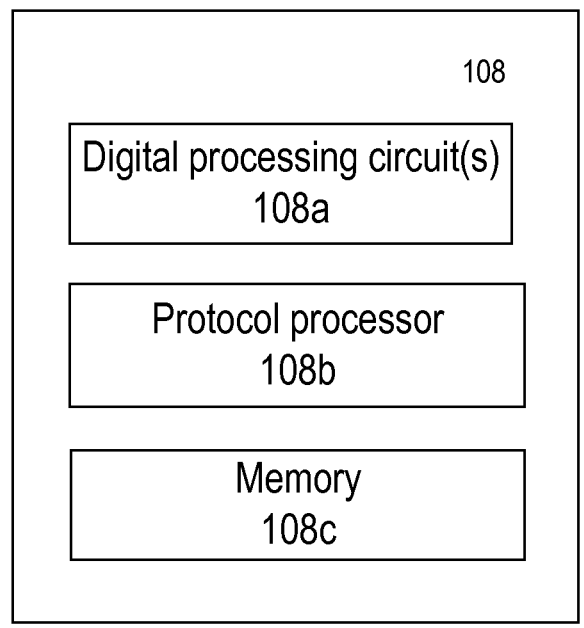
FIG. 2 shows a block diagram illustrating an internal configuration of the baseband modem.

FIG. 2 shows a block diagram 200 illustrating an internal configuration of baseband modem 108 according to an aspect of the disclosure. Baseband modem 108 may include digital processing circuit(s) 108a (i.e., one or more digital processing circuits), protocol processor 108b, and baseband memory 108c. Although not explicitly shown in FIG. 2, baseband modem 108 may contain one or more additional components, including, e.g., one or more analog processing circuits.

Digital processing circuit(s) 108a may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 108a may include hardware, software, or a combination of hardware and software. Specifically, digital processing circuit(s) 108a of baseband modem 108 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of ordinary skill in the art will appreciate the corresponding structure disclosed herein, be it in explicit reference to a physical structure and/or in the form of mathematical formulas, prose, flow charts, or any other manner providing sufficient structure (such as, e.g., regarding an algorithm). The components of baseband modem 108 may be detailed herein substantially in terms of functional operation in recognition that a person of ordinary skill in the art may readily appreciate the various possible structural realizations of baseband modem 108 using digital processing circuitry that will provide the desired functionality.

Baseband modem 108 be configured to operate one or more protocol stacks, such as a GSM protocol stack, a UMTS protocol stack, an LTE protocol stack, etc. Baseband modem 108 may be "multi-mode" and may thus be configured to operate in accordance with multiple RATs by executing multiple protocol stack instances simultaneously. Accordingly, protocol processor 108b may be provided in order to execute one or more protocol stack instances. Protocol processor 108b may be, e.g., a processor, microprocessor, controller, microcontroller, Central Processing Unit (CPU), etc. For example, protocol processor 108b may be a microcontroller, and, therefore, may include a processor core, memory, and programmable input/output peripherals. Protocol processor 108b may be configured to execute the one or more protocol stack instances by executing program code corresponding to the one or more protocol stack instances, such as program code stored in an internal memory of protocol processor 108b (e.g., for protocol processor 108b implemented as a microcontroller) or in baseband memory 108c. By executing the one or more protocol stack instances, protocol processor 108b may act as a controller for operations of baseband modem 108, and may accordingly directly and/or indirectly control operations of digital processing circuit(s) 108a, baseband memory 108c, antenna 104, RF transceiver 106, other audio/video components (e.g., audio transducers including microphone(s) and/or speaker(s)), application processor 110, etc.).

Baseband memory 108c may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s), etc., or any combination thereof. Baseband memory 108 may be configured to store software elements, which may be retrieved and executed using a processor component of digital processing circuit(s) 108a. Although depicted as a single component in FIG. 2, baseband memory 108c may be implemented as one or more separate components in baseband modem 108. Baseband memory 108c may also be partially or fully integrated with digital processing circuit(s) 108a.

As will be detailed, baseband modem 108 may include one or more digital processing circuits (digital processing circuit(s) 108a and/or protocol processor 108b) and a memory (baseband memory 108c). Baseband modem 108 may be configured to: receive a page; obtain message identification information 124 from the page; process the obtained message identification information 124; and control an ongoing network connection resulting from the processed message identification information 124.

Figure 3:
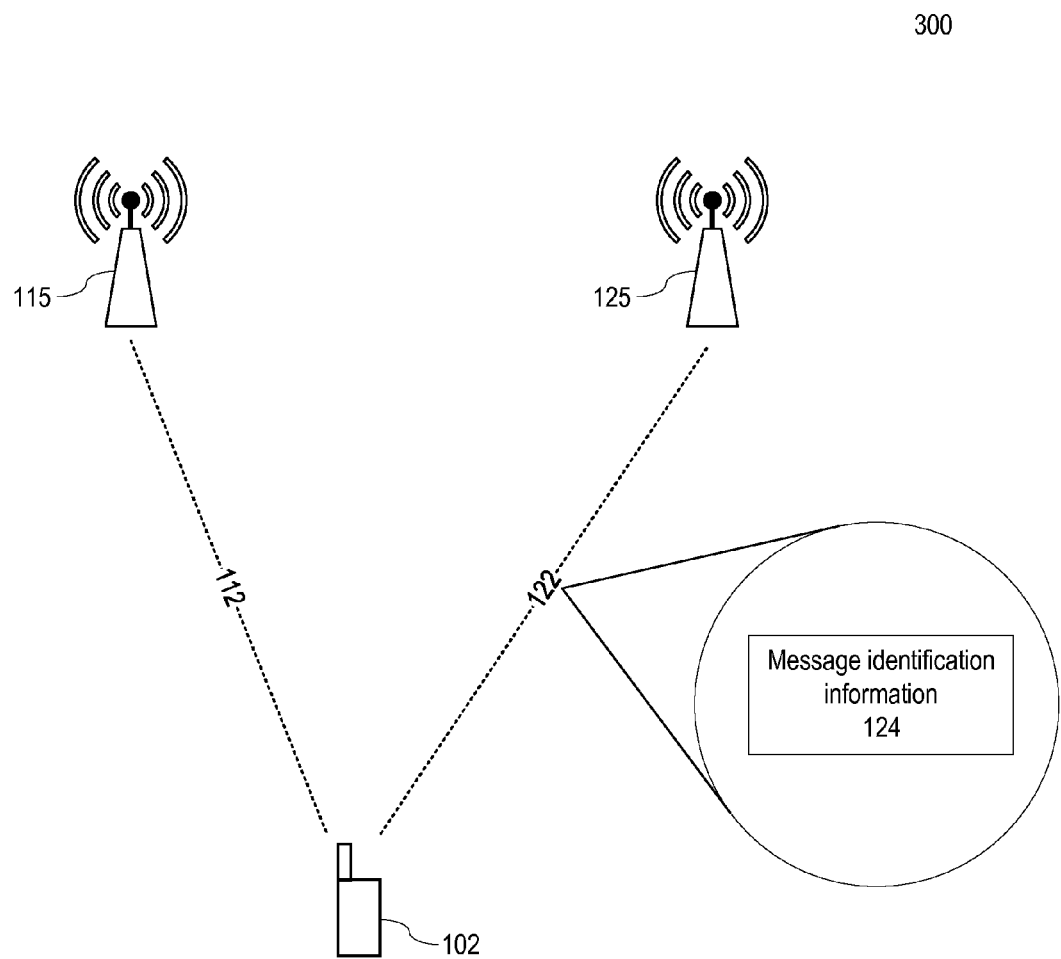
FIG. 3 shows an illustration of mobile communication device in a mobile communications network.

FIG. 3 shows an illustration 300 of mobile communication device 102 in a mobile communications network. Mobile communications device 102 communicates via an air interface depicting an ongoing network connection 112 with base station 115, as well as with base station 125 via an air interface depicting a page 122, which may include message identification information 124. Base station 115 may be able to operate one or more RATS, e.g., 2G or LTE. Similarly, base station 125 may be able to operate one or more RATs.

Figure 4:
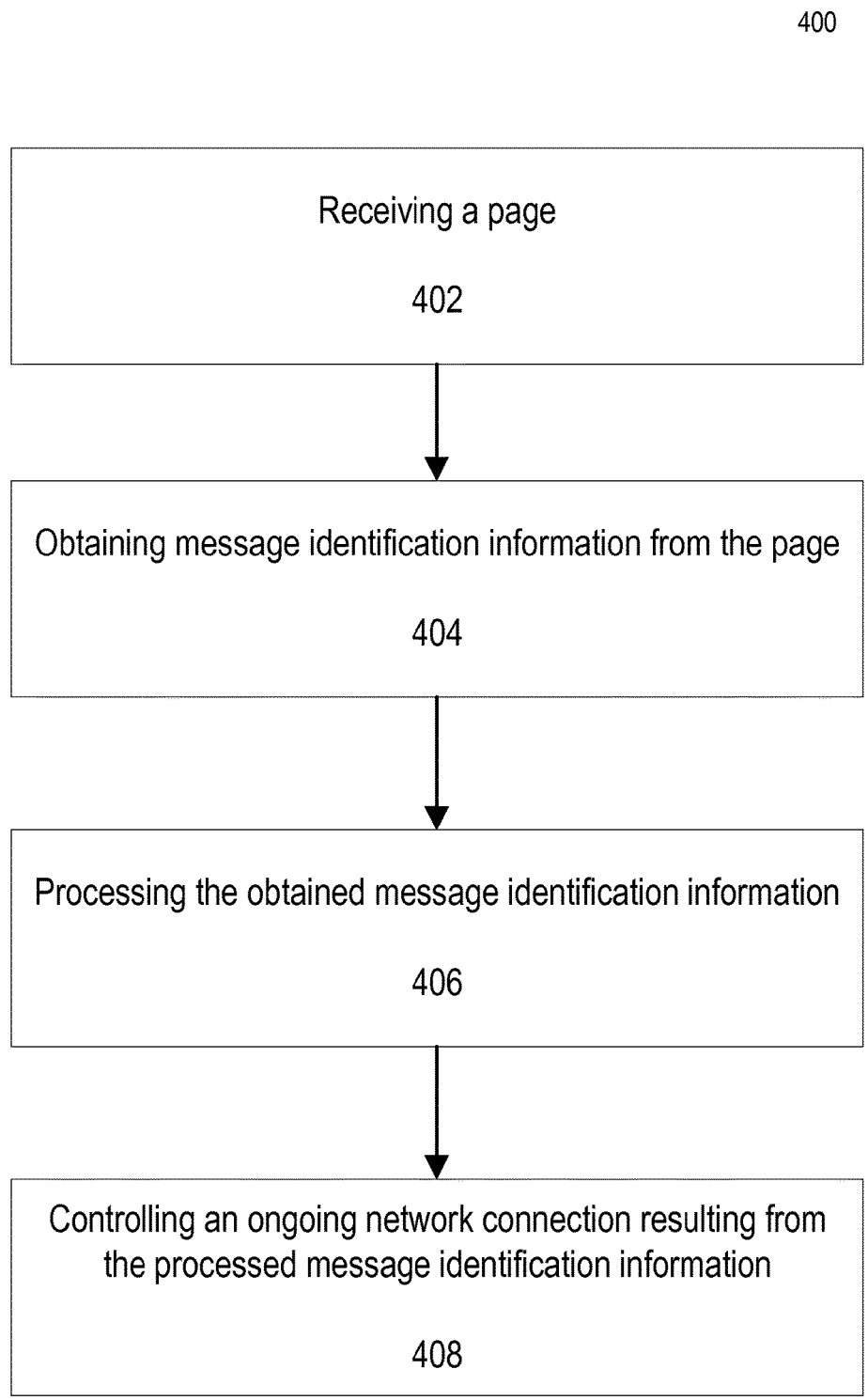
FIG. 4 shows a method for controlling a mobile communications device

FIG. 4 shows a method 400 for controlling a mobile communications device. It is to be contemplated the following disclosure is applicable to a method and a configuration for a mobile communications device 102 including a radio processing circuit and a baseband circuit adapted to interact with the radio processing circuit. The method or configuration may also be implemented as non-transitory computer readable medium. In an aspect of the disclosure, the mobile communications device 102 may have two SIMs, e.g., a first SIM 111 and a second SIM 222, a radio processing circuit and a baseband processing circuit adapted to interact with the radio processing circuit. The second SIM 222 may be engaged in an ongoing network connection, e.g., a 2G CS call.

As discussed above, PS or CS services for the first SIM 111 may be ignored if second SIM 222 has an ongoing CS call, e.g., an ongoing 2G call. These ignored services may be identified in a core network domain (cn-Domain) information element (IE) present in the paging record of an incoming page, e.g., intended for first SIM 111.

Caller-ID or an SMS may, therefore, be displayed to a user of mobile communications device 102 even though the second SIM 222 may be engaged. This may be effected by briefly suspending the ongoing network connection, e.g., an ongoing 2G CS call, and creating a gap in the ongoing network connection as discussed below. However, early identification of the paging type, e.g., an LTE paging type, may help prevent unnecessary interruption of the ongoing network connection. This identification may be effected without establishing a radio resource control connection (RRC), i.e., in RRC idle state. This may advantageously avoid wasting precious radio resources, thus effectively increasing cell capacity.

In an aspect of the disclosure the above disclosure may be effected by method 400, which includes: receiving a page 122 (402); obtaining message identification information 124 from the page 122 (404); processing the obtained message identification information 124 (406); and controlling an ongoing network connection 112 resulting from the processed message identification information 124 (408). The page 122 may be, e.g., an LTE paging type. The page 122 may include IEs (information elements) in the form of a paging record, e.g., message identification information 124. The page 122 may identify a core network domain or an Access Point Name (APN). The core network domain may map to an APN.

Obtaining the message identification information 124 (404) from the page 122 may further include attaining a core network domain (cn-Domain) from the page 122, i.e., the core network domain, for example, may identify information about the type of message which is indicated by the received page 122. In an aspect of the disclosure, which may be in accordance with current 3GPP standards, the core network domain may be an enumerated type core network domain, such as circuit switched or packet switched. In another aspect of the disclosure, the enumerated type may be one of, or at least one of, circuit switched, packet switched, and internet protocol multimedia subsystem (IMS). In another aspect of the disclosure, the core network domain may map to a gateway identifier, e.g., an APN. The APN may identify one of, or at least one of, PS data, IMS, voice over LTE (VoLTE), and SMS. For example, a PCCH (paging control channel) message type page including an enumerated core network domain type may appear as follows:

```
PCCH-MessageType ::= CHOICE {
    c1                  CHOICE paging   Paging  },
    messageClassExtension    SEQUENCE { } }
Paging ::=    SEQUENCE {
    pagingRecordList         PagingRecordList        OPTIONAL, -- Need ON
    systemInfoModification   ENUMERATED {true}       OPTIONAL, -- Need ON
    etws-Indication          ENUMERATED {true}       OPTIONAL, --Need ON
    nonCriticalExtension     Paging-v890 IEs         OPTIONAL }
PagingRecordList ::=         SEQUENCE (SIZE (1..maxPageRec)) OF
PagingRecord
PagingRecord ::=             SEQUENCE {
ue-Identity                      PagingUE-Identity,
cn-Domain                        ENUMERATED    {ps, cs, ims},
...
}
```

Here, for example, the enumerated core network domain type may be one of PS, CS, and IMS. Thus, according to an aspect of the disclosure, the enumerated core network domain type may be attained from the obtained message identification information 124 in the page. The obtained message identification information 124, e.g., an enumerated core network domain type or an APN, may then be further processed.

Processing the obtained message identification information 124 may further include arbitrating between communication resources for a first subscriber identity module (SIM), e.g., first SIM 111, and a second subscriber identity module (SIM), e.g., second SIM 222. As discussed above, the communication resources may include at least one receiver and at least one transmitter, e.g., composed as parts of RF 106, including, for example, two receivers (or two receive channels) and one transmitter. Therefore, it may only be possible to handle communications for a single SIM at any given time, i.e., if the first SIM 111 has an ongoing 2G CS call, e.g., an ongoing network connection 112, due to the constraints of the communication resources, the mobile communications device 102 may not be able to communicate in response to the page 122 for the second SIM 222 as the transmitter, e.g., a transmitter part of RF 106, may currently be handling communication for the ongoing 2G CS call.

Furthermore, mobile communications device 102, as discussed above, via an implementation of RF 106, baseband modem 108, and/or application processor 110, may be configured to arbitrate between the communication resources. This implementation may include (not explicitly illustrated) storing at least one enumerated core network domain type, e.g., at least one of CS, PS, and IMS, as well as potentially storing at least one predefined APN, e.g., at least one of PS, IMS, SMS, and VoLTE. For example, the stored enumerated core network domain type, e.g., message identification information 124, may be compared with the obtained message identification information 124, and if matching the stored or predefined message identification information 124, the mobile communication device 102 may be prompted (by logic, circuitry, software, hardware, or some combination thereof, as discussed above) to control the ongoing network connection 112.

For example, a part of digital processing circuit 108a, protocol processor 108b, or memory 108c (or any combination or integration thereof), may be identified as an arbitration services module (ASM), which provides multi-SIM related arbitration services and routes messages across multiple instances of NAS (non-access stratum) and AS (access stratum). The ASM may be preconfigured with enumerated types of core network domain information, e.g., CS, PS, or IMS, or with APN core network domain information, e.g., VoLTE, IMS, SMS. This preconfigured message identification information 124 may be used to later match the core network domain field of paging records from a received page 122 and thus obtain and process the paging type and the message identification information 124.

Identifying the paging type, e.g., message identification information 124, may also be referred to in terms of PS-data, e.g., PS data, IMS data, VoLTE data, and non-PS-data, e.g., CS. With early identification from obtaining and processing this information, an RRC connection need not be established, e.g., the message identification information 124 can be identified in RRC idle state.

In an aspect of the disclosure, which may be in accordance with current 3GPP standards, the arbitration may further include prompting the mobile communications device 102 to control the ongoing network connection 112 of the second subscriber identity module 222 if the message identification information 124 of the page 122 is an enumerated packet switched type, i.e., if the page 122 contains message identification information 124 that identifies the message is PS, e.g., an enumerated packet switched type core network domain in the paging record, then the mobile communications device 102 will be prompted to control the ongoing network connection 112 (discussed below).

In another aspect of the disclosure, which may also be in accordance with current 3GPP standards, the arbitration may further include prompting the mobile communications device 102 to ignore the page 122 for the first subscriber identity module, e.g., first SIM 111, if the message identification information 124 of the page 122 is an enumerated circuit switched type and the second subscriber identity module, e.g., second SIM 222, has an ongoing circuit switched network connection, e.g., ongoing network connection 112. Ignoring the page 122 may entail mobile communications device 102 not reacting to the page, e.g., not establishing an RRC connection in response to the page 122 type.

In another aspect of the disclosure, the arbitration may include prompting the mobile communications device 102 to control the ongoing network connection 112 of the second subscriber identity module, e.g., second SIM 222, if the message identification information 124 of the page is an enumerated IMS type.

In an aspect of the disclosure, the arbitration may include prompting the mobile communications device 102 to control the network connection 112 of the second subscriber identity module, e.g., second SIM 222, if the message identification information 124 of the page 122 is an enumerated packet switched type and the ongoing network connection is also packet switched.

In another aspect of the disclosure, the arbitration may include comparing a predefined (preconfigured) gateway identifier, e.g., an APN identifying at least one of IMS, VoLTE, and SMS, to the obtained message identification information 124 of the page 122 for the first subscriber identity module, e.g., first SIM 111.

In an aspect of the disclosure, the comparison may include prompting the mobile communications device 102 to ignore the page 122 for the first subscriber identity module, e.g., first SIM 111, if the message identification information 124 of the page 122 includes a core network domain that maps to a packet switched gateway identifier, e.g., IMS, VoLTE, and SMS, and the ongoing network connection 112 of the second subscriber identity module, e.g., second SIM 222, is circuit switched. Ignoring the page 122 may entail mobile communications device 102 not reacting to the page, e.g., not establishing an RRC connection in response to the page 122 type.

In an aspect of the disclosure the comparison may include prompting the mobile communications device 102 to control the ongoing network connection 112 of the second subscriber identity modules, e.g., second SIM 222, if the message identification information 124 of the page 122 includes a core network domain that maps to a packet switched data gateway identifier and the ongoing network connection 122 is also packet switched.

In an aspect of the disclosure, the comparison may include prompting the mobile communications device 102 to control the ongoing network connection 112 of the second subscriber identity module, e.g., second SIM 222, if the message identification information 124 of the page 122 includes a core network domain that maps to one of an IMS, VoLTE, and SMS data gateway identifier that is identified as the predefined gateway identifier and the ongoing network connection is also packet switched.

In an aspect of the disclosure, the comparison may include prompting the mobile communications device 102 to control the ongoing network connection 112 of the second subscriber identity module, e.g., second SIM 222, if the message identification information 124 of the page comprises a core network domain that maps to one of an IMS, VoLTE, and SMS data gateway identifier that is identified as the predefined gateway identifier and the ongoing network connection 112 is circuit switched.

If the mobile communications device 102 is prompted to control the ongoing network connection 112 resulting from the processed message identification information 124 (408), the mobile communications device 102 may suspend the ongoing network connection 112 by creating a gap, i.e., the operation of, e.g., the baseband modem 108, will be utilized for communications on the first SIM, e.g., first SIM 111, thereby creating a gap, or period of time, where communications for the ongoing network connection 112, e.g., an ongoing 2G voice call, are suspended. This gap may be similar to a gap created for inter-RAT measurements with transmission (TX) and reception (RX) suspended. The gap may last up to three seconds, however, RRC reconfiguration and processing of a SIP (session initiation protocol) invite can be accomplished within a shorter time. As networks make periodic checks on the uplink SACCH (slow associated control channel) approximately every twenty-five seconds to ensure the 2G CS call is still active, the three second suspension of TX and RX in this gap should not cause issues.

In an aspect of the disclosure, controlling the ongoing network connection 112 may further include establishing a network communication control connection, e.g., from an RRC idle state, establishing an RRC connection during the gap. As well as, reconfiguring the network communication control connection (reconfiguring the RRC to, e.g., QCI 5 (quality of service (QoS) class identifier) to receive session signaling, e.g., SIP signaling. The session signaling may include, for example, a SIP invite or SIP message. Controlling the ongoing network connection 112 may further include determining a core network domain pathway, e.g., a data radio bearer (DRB), such as a DRB mapped to an EPS (evolved packet system) bearer.

In an aspect of the disclosure, the enumerated core network domain type may not distinguish between types of PS data. It may, therefore, in an aspect of the disclosure, be required each time PS data is the enumerated type, to establish, e.g., an RRC connection, if an ongoing network connection 112 is CS, e.g., an ongoing 2G CS call on the second SIM 222. The DRB may subsequently be mapped to the EPS bearer, and the pathway of the EPS bearer may be determined to consider if caller-ID or an SMS can be extracted, e.g., if the DRB maps to a VoLTE EPS bearer. If, on the other hand, the core network domain pathway is established with a packed switched core network domain, e.g., if the radio bearer leads to a PS core network domain, the network communication control connection, e.g., RRC connection is released and returns to an idle state. Furthermore, the ongoing network connection 112 is resumed, e.g., the 2G CS voice call, and the gap is ended.

As discussed above, if it is determined the pathway is mapped to an IMS core network domain, e.g., the DRB is mapped to a VoLTE EPS bearer, an IMS EPS bearer, or an SMS EPS bearer, etc., the determination may further include receiving session signaling (e.g., SIP) indicated in the page 122, e.g., receiving information related to or directed from the SIP invite or SIP message. The mobile communications device 102 may then transmit at least one of a rejection and an acknowledgment for the session signaling (e.g., SIP invite) indicated in the page, and obtain at least one of a called identification (caller-ID) and an SMS message from the session signaling. The SIP invite may, for example, include the user equipment (UE) identity from an incoming VoLTE call that can be extracted, or an SIP message, may for example, include a text message, or SMS, that can be extracted. After obtaining the caller-ID or an SMS message, the network communication control connection may be released (e.g., the RRC connection) and may return to an idle state. Subsequently, the gap for the ongoing network communication 112 may be ended and the connection resumed.

Additionally, it may be advantageous to limit the maximum time for the gap in the ongoing network connection 112, e.g., three seconds, in the case there may be issues establishing the network communication control connection or receiving session signaling. Therefore, the gap may be timed, which may be suitably implemented by circuitry, logic, hardware, software, or any combination thereof, to keep track of the elapsed time for the gap, or a countdown may be used. Alternatively or in combination, the ongoing network connection may be first resumed after at least one of the caller-ID and an SMS message is obtained.

In another aspect of the disclosure, controlling the ongoing network connection 112 may include suspending a second packet switched network connection on a second subscriber identity module, e.g., second SIM 222, and activating a first packet switched network connection on a first subscriber identity module, e.g., first SIM 111, for example, if the second packet switched network connection is 2G, it may be suspended, while a first packet switched network connection, e.g., 4G, is established in order to take advantage of the 4G connection or to receive the page and associated packet switched data for the, e.g., first SIM 111.

Similarly, if the ongoing network connection is packet switched, e.g., a 2G PS data connection on the second SIM 222, and the incoming page 122 indicates message identification information 124 for IMS, VoLTE, or SMS, the second ongoing PS network connection may be suspended and a first PS network connection may be established for the first SIM, e.g., first SIM 111. In the case of SMS, the SMS may be extracted from an SIP message and the SMS message may be forwarded to higher layers for, e.g., storage in an SMS message inbox.

Figure 5:
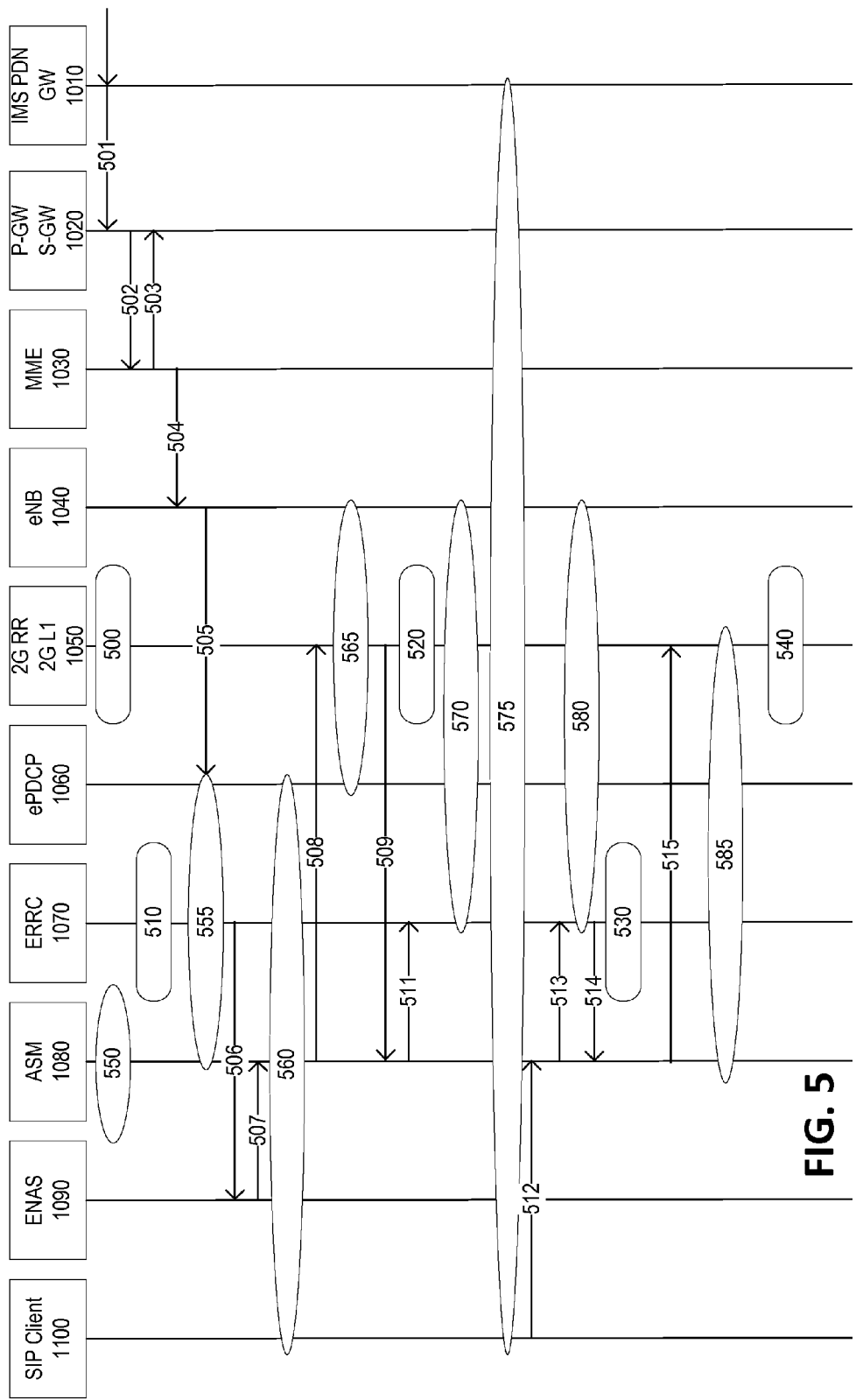
FIG. 5 shows a message sequence chart illustrating a configuration of the mobile communications device.

FIG. 5 shows a message sequence chart (MSC) illustrating an aspect of the disclosure that highlights states, message flow across various components, and logic to accomplish the methodologies or principles discussed above for mobile communications device 102.

For example, mobile communications device 102 may have an active, ongoing 2G CS call on a second SIM or an active PS connection (element 500 under 2G RR (radio resource)/2G L1 1050), e.g., on second SIM 222, on a main digital RF transceiver path and LTE may be in an RRC idle state (RRC LIMITED IDLE PS or RRC LIMITED IDLE CS 510) on an auxiliary digital RF transceiver path for, e.g., first SIM 111, after establishing PDN (packet data network) connectivity with an internet PDN and IMS PDN. ASM 1080 is preconfigured (element 550) with enumerated data types such as IMS, CS, or PS, or APNs such as IMS, VoLTE, or SMS, for both PDNs.

An SIP invite, for example, may be initiated to set up a VoLTE call (501). IMS PDN gateway 1010 may transmit the SIP invite as a T-PDU (protocol data unit) to packet data network gateway (P-GW) and/or serving gateway (S-GW) 1020, which may transmit a GTP-C data notification (general packet radio service tunneling protocol) to MME (mobility management entity) 1030, which may respond with an acknowledgement 503. MME 1030 may transmit S1-AP (application protocol) paging (S-TMSI) (S-temporary mobile subscriber identification) 504 to eNodeB 1040. This may trigger RRC paging (S-TMSI) 505.

In 555, the RRC paging is received, including the UE-identity from the paging record which matches a UE identity allocated by upper layers. ERRC 1070 (evolved universal terrestrial radio access radio resource control) may then forward 506 the UE-identity and core network domain from the RRC page 505 to ENAS 1090 (enhanced non-access stratum), which, in turn, establishes a request for MT (mobile terminated) PS paging with the ASM 1080.

The ASM 1080 may then match (arbitrate or compare) preconfigured APNs or preconfigured enumerated core network domains with the message identification information 124, e.g., enumerated core network domain type, from the page 122. The paging type may, for example, be identified as a VoLTE call in the ASM logic 1080. ASM 1080 may then request (RR ARB (arbitration) SUSPEND REQ (request) TX 508) to initiate creation of a gap 520 in the ongoing 2G CS call (500). The RR then requests 2G L1 to create a gap and switch the RF 106 path with LTE 565, which transmits RR ARB SUSPEND CNF (confirm) 509 to ASM 1080. ASM 1080 may then transmit ERRC ARB RESUME IND to ERRC 1070. ERC 1070 in LTE may reconfigure the default bearer, e.g., for QCI=5, to allow the UE SIP client 1100 to receive SIP signaling (or IMS signaling) from the network 570.

UE SIP client 1100 may then receive the SIP invite or SIP message over the reconfigured default bearer. Caller-ID may then be extracted by the SIP client 1100 if it is a SIP invite or the SMS message may be extracted if it is a SIP message 575. The caller-ID or SMS may be passed over to a display driver or storage (memory). The SIP client 1100 does not process further SIP signaling and may transmit a rejection to SIP invite or ACK to SIP message, respectively. SIP Client 1100 may transmit to ASM 1080 the processing of the SIP invite or SIP message is complete 512. ASM 1080 transmits ERRC ARB REL IND 513 to eRRC 1070 which may release the RRC connection 580, the eRRC 1070 transmitting ERRC ARB REL CNF 514 to ASM 1080. LTE may then be in idle state, e.g., RRC LIMITED IDLE CS 530.

ASM 1080 may then transmit RR ARB RESUME IND 515 to 2G RR 1050 to resume the 2G CS activity, e.g., the ongoing 2G CS voice call on second SIM 222. 2G L1 may then abort the gap and initiate the RF path switch 585. The 2G CS call is then active again on the main digital RF transceiver path and LTE is back on the auxiliary digital RF transceiver path in idle state 540.

An example 1 discloses a method for controlling a mobile communications device in response to a page including: receiving a page; obtaining message identification information from the page; processing the obtained message identification information; and controlling an ongoing network connection resulting from the processed message identification information.

Example 2 may include the method of example 1, wherein controlling the ongoing network connection includes: suspending the ongoing network connection by creating a gap.

Example 3 may include the method of example 1, further including: wherein controlling the ongoing network connection includes: establishing a network communication control connection during the gap.

Example 4 may include the method of example 3, further including: wherein controlling the ongoing network connection includes: reconfiguring the network communication control connection to receive session signaling.

Example 5 may include the method of example 3, further including: wherein controlling the ongoing network connection includes: determining a core network domain pathway.

Example 6 may include the method of example 5, wherein the core network domain pathway is a data radio bearer.

Example 7 may include the method of example 6, wherein the data bearer is a data radio bearer mapped to an EPS bearer.

Example 8 may include the method of example 5, further including: wherein determining of the core network domain pathway further includes: releasing the network communication control connection and returning to an idle state if the core network domain pathway is established with a packet switched core network domain.

Example 9 may include the method of example 8, further including: wherein determining of the core network domain pathway further includes: resuming the ongoing network connection and ending the gap.

Example 10 may include the method of example 5, further including: wherein determining of the core network domain pathway further includes: receiving session signaling indicated in the page if the core network domain pathway is established with an IMS core network domain.

Example 11 may include the method of example 10, further including: wherein determining of the core network domain pathway further includes: transmitting at least one of a rejection and an acknowledgment for the session signaling indicated in the page.

Example 12 may include the method of example 10, further including: wherein determining of the core network domain pathway further includes: obtaining at least one of a caller identification and an SMS message from the session signaling.

Example 13 may include the method of example 10, further including: wherein determining of the core network domain pathway further includes: releasing the network communication control connection and returning to an idle state.

Example 14 may include the method of example 10, further including: wherein determining of the core network domain pathway further includes: resuming the ongoing network connection and ending the gap.

Example 15 may include the method of example 14, wherein the ongoing network connection is resumed if the gap exceeds a predetermined amount of time.

Example 16 may include the method of example 15, wherein the predetermined amount of time is a maximum of three seconds.

Example 17 may include the method of example 14, wherein the ongoing network connection is resumed following obtaining at least one of a caller identification and an SMS message.

Example 18 may include the method of one of examples 12 or 17, wherein the caller identification from the session signaling is obtained from a SIP invite.

Example 19 may include the method of one of examples 12 or 17, wherein the SMS from the session signaling is obtained from an SIP message.

Example 20 may include the method of any of examples 3, 4, 8, and 13, wherein the network communication control connection is an RRC connection.

Example 21 may include the method of any of examples 4, 10-12, 18, and 19, wherein the session signaling is session initiation protocol signaling.

Example 22 may include the method of example 1, wherein controlling the ongoing network connection includes: suspending a second packet switched network connection for the ongoing network connection on a second subscriber identity module and activating a first packet switched network connection on a first subscriber identity module.

Example 23 may include the method of example 22, wherein the second packet switched network connection is 2G.

Example 24 may include the method of example 22, wherein the first packet switched network connection is 4G.

Example 25 may include the method of example 1, wherein obtaining message identification information includes: attaining a core network domain from the page.

Example 26 may include the method of example 25, wherein the core network domain is an enumerated type core network domain.

Example 27 may include the method of example 26, wherein the enumerated type is one of circuit switched or packet switched.

Example 28 may include the method of example 26, wherein the enumerated type is at least one of circuit switched, packet switched, and IMS.

Example 29 may include the method of example 26, wherein the enumerated type is IMS.

Example 30 may include the method of example 25, wherein the core network domain maps to a gateway identifier.

Example 31 may include the method of example 30, wherein the gateway identifier is an APN.

Example 32 may include the method of example 31, wherein the APN identifies at least one of packet switched data, IMS, VoLTE, and SMS.

Example 33 may include the method of example 1, wherein processing the obtained message identification information includes: arbitrating between communication resources for a first subscriber identity module and a second subscriber identity module.

Example 34 may include the method of example 33, wherein the communication resources comprise at least one receiver and at least one transmitter.

Example 35 may include the method of example 33, wherein the arbitration includes: prompting the mobile communications device to control the ongoing network connection of the second subscriber identity module if the message identification information of the page is an enumerated packet switched type.

Example 36 may include the method of example 33, wherein the arbitration includes: prompting the mobile communications device to ignore the page for the first subscriber identity module if the message identification information of the page is an enumerated circuit switched type and the second subscriber identity module has an ongoing circuit switched network connection.

Example 37 may include the method of example 33, wherein the arbitration includes: prompting the mobile communications device to control the ongoing network connection of the second subscriber identity module if the message identification information of the page is an enumerated IMS type.

Example 38 may include the method of example 33, wherein the arbitration includes: prompting the mobile communications device to control the ongoing network connection of the second subscriber identity module if the message identification information of the page is an enumerated packet switched type and the ongoing network connection is also packet switched.

Example 39 may include the method of example 33, wherein the arbitration includes: prompting the mobile communications device to ignore the page for the first subscriber identity module if the message identification information of the page is an enumerated packet switched type and the ongoing network connection of the second subscriber identity module is circuit switched.

Example 40 may include the method of example 33, wherein the arbitration includes: comparing a predefined gateway identifier to the obtained message identification information of the page for the first subscriber identity module.

Example 41 may include the method of example 40, wherein the predefined gateway identifier identifies at least one of an APN for IMS, VoLTE, and SMS.

Example 42 may include the method of example 40, wherein the comparison includes: prompting the mobile communications device to ignore the page for the first subscriber identity module if the message identification information of the page includes a core network domain that maps to a packet switched data gateway identifier and the ongoing network connection of the second subscriber identity module is circuit switched.

Example 43 may include the method of example 40, wherein the comparison includes: prompting the mobile communications device to control the ongoing network connection of the second subscriber identity module if the message identification information of the includes a core network domain that maps to a packet switched data gateway identifier and the ongoing network connection is also packet switched.

Example 44 may include the method of example 40, wherein the comparison includes: prompting the mobile communications device to control the ongoing network connection of the second subscriber identity module if the message identification information of the page includes a core network domain that maps to one of an IMS, VoLTE, and SMS data gateway identifier that is identified as the predefined gateway identifier and the ongoing network connection is also packet switched.

Example 45 may include the method of example 40, wherein the comparison includes: prompting the mobile communications device to control the ongoing network connection of the second subscriber identity module if the message identification information of the page includes a core network domain that maps to one of an IMS, VoLTE, and SMS data gateway identifier that is identified as the predefined gateway identifier and the ongoing network connection is circuit switched.

Example 46 may include the method of any of examples 1, 10, 11, 25, 35-40, and 42-45, wherein the page is for a first subscriber identity module.

Example 47 may include the method of example 46, wherein the first subscriber identity module is a multi-radio access technology subscriber identity module.

Example 48 may include the method of example 47, wherein one of the multi-radio access technologies for the first subscriber identity module is LTE.

Example 49 may include the method of any of examples 1-5, 9, 14, 15, 17, 22, 35-39, 42-45, and 49, wherein the ongoing network connection is on a second subscriber identity module.

Example 50 may include the method of example 49, wherein the second subscriber identity module is a 2G only subscriber identity module.

Example 51 may include the method of example 49, wherein the ongoing network connection is an ongoing voice call.

An example 52 discloses a mobile communications device including a radio processing circuit and a baseband processing circuit adapted to interact with the radio processing circuit, the mobile communications device configured to: receive a page; obtain message identification information from the page; process the obtained message identification information; and control an ongoing network connection resulting from the processed message identification information.

Example 54 may include the mobile communications device of example 52, wherein the controlling of the ongoing network connection further includes: suspending the ongoing network connection by creating a gap.

Example 55 may include the mobile communications device of example 52, wherein the controlling of the ongoing network connection further includes: establishing a network communication control connection during the gap.

Example 56 may include the mobile communications device of example 52, wherein the controlling of the ongoing network connection further includes: reconfiguring the network communication control connection to receive session signaling.

Example 57 may include the mobile communications device of example 52, wherein the controlling of the ongoing network connection further includes: determining a core network domain pathway.

Example 58 may include the mobile communications device of example 56, wherein the core network domain pathway is a data radio bearer.

Example 59 may include the mobile communications device of example 57, wherein the data bearer is a data radio bearer mapped to an EPS bearer.

Example 60 may include the mobile communications device of example 56, wherein the determining of the core network domain pathway further includes: releasing the network communication control connection and returning to an idle state if the core network domain pathway is established with a packet switched core network domain.

Example 61 may include the mobile communications device of example 59, wherein the determining of the core network domain pathway further includes: resuming the ongoing network connection and ending the gap.

Example 62 may include the mobile communications device of example 56, wherein the determining of the core network domain pathway further includes: receiving session signaling indicated in the page if the core network domain pathway is established with an IMS core network domain.

Example 63 may include the mobile communications device of example 61, wherein the determining of the core network domain pathway further includes: transmitting at least one of a rejection and an acknowledgment for the session signaling indicated in the page.

Example 64 may include the mobile communications device of example 61, wherein the determining of the core network domain pathway further includes: obtaining at least one of a caller identification and an SMS message from the session signaling.

Example 65 may include the mobile communications device of example 61, wherein the determining of the core network domain pathway further includes: releasing the network communication control connection and returning to an idle state.

Example 66 may include the mobile communications device of example 61, wherein the determining of the core network domain pathway further includes: resuming the ongoing network connection and ending the gap.

Example 67 may include the mobile communications device of example 62, wherein the resuming the ongoing network connection and ending the gap further includes: wherein the ongoing network connection is resumed if the gap exceeds a predetermined amount of time.

Example 68 may include the mobile communications device of example 66, wherein the predetermined amount of time is a maximum of three seconds.

Example 69 may include the mobile communications device of example 65, wherein the ongoing network connection is resumed following obtaining at least one of a caller identification and an SMS message.

Example 70 may include the mobile communications device of one of examples 63 and 68, wherein the caller identification from the session signaling is obtained from a SIP invite.

Example 71 may include the mobile communications device of one of examples 63 and 68, wherein the SMS from the session signaling is obtained from an SIP message.

Example 72 may include the mobile communications device of one of examples 54, 55, 59, and 64, wherein the network communication control connection is an RRC connection.

Example 73 may include the mobile communications device of one of examples 55, 61-63, 69, and 70, wherein the session signaling is session initiation protocol signaling.

Example 74 may include the mobile communications device of example 52, wherein the controlling of the ongoing network connection includes: suspending a second packet switched network connection for the ongoing network connection on a second subscriber identity module and activating a first packet switched network connection on a first subscriber identity module.

Example 75 may include the mobile communications device of example 73, wherein the second packet switched network connection is 2G.

Example 76 may include the mobile communications device of example 73, wherein the first packet switched network connection is 4G.

Example 77 may include the mobile communications device of example 52, wherein the obtaining of the message identification information includes: attaining a core network domain from the page.

Example 78 may include the mobile communications device of example 76, wherein the core network domain is an enumerated type core network domain.

Example 79 may include the mobile communications device of example 77, wherein the enumerated type is one of circuit switched or packet switched.

Example 80 may include the mobile communications device of example 77, wherein the enumerated type is at least one of circuit switched, packet switched, and IMS.

Example 81 may include the mobile communications device of example 77, wherein the enumerated type is IMS.

Example 82 may include the mobile communications device of example 76, wherein the core network domain maps to a gateway identifier.

Example 83 may include the mobile communications device of example 81, wherein the gateway identifier is an APN.

Example 84 may include the mobile communications device of example 82, wherein the APN identifies at least one of packet switched data, IMS, VoLTE, and SMS.

Example 85 may include the mobile communications device of example 52, wherein the processing of the obtained message identification information includes: arbitrating between communication resources for a first subscriber identity module and a second subscriber identity module.

Example 86 may include the mobile communications device of example 84, wherein the communication resources comprise at least one receiver and at least one transmitter.

Example 87 may include the mobile communications device of example 84, wherein the arbitration includes: prompting the mobile communications device to control the ongoing network connection of the second subscriber identity module if the message identification information of the page is an enumerated packet switched type.

Example 88 may include the mobile communications device of example 84, wherein the arbitration includes: prompting the mobile communications device to ignore the page for the first subscriber identity module if the message identification information of the page is an enumerated circuit switched type and the second subscriber identity module has an ongoing circuit switched network connection.

Example 89 may include the mobile communications device of example 84, wherein the arbitration includes: prompting the mobile communications device to control the ongoing network connection of the second subscriber identity module if the message identification information of the page is an enumerated IMS type.

Example 90 may include the mobile communications device of example 84, wherein the arbitration includes: prompting the mobile communications device to control the ongoing network connection of the second subscriber identity module if the message identification information of the page is an enumerated packet switched type and the ongoing network connection is also packet switched.

Example 91 may include the mobile communications device of example 84, wherein the arbitration includes: prompting the mobile communications device to ignore the page for the first subscriber identity module if the message identification information of the page is an enumerated packet switched type and the ongoing network connection of the second subscriber identity module is circuit switched.

Example 92 may include the mobile communications device of example 84, wherein the arbitration includes: comparing a predefined gateway identifier to the obtained message identification information of the page for the first subscriber identity module.

Example 93 may include the mobile communications device of example 91, wherein the predefined gateway identifier identifies at least one of an APN for IMS, VoLTE, and SMS.

Example 94 may include the mobile communications device of example 91, wherein the comparison includes: prompting the mobile communications device to ignore the page for the first subscriber identity module if the message identification information of the page includes a core network domain that maps to a packet switched data gateway identifier and the ongoing network connection of the second subscriber identity module is circuit switched.

Example 95 may include the mobile communications device of example 91, wherein the comparison includes: prompting the mobile communications device to control the ongoing network connection of the second subscriber identity module if the message identification information of the page includes a core network domain that maps to a packet switched data gateway identifier and the ongoing network connection is also packet switched.

Example 96 may include the mobile communications device of example 91, wherein the comparison includes: prompting the mobile communications device to control the ongoing network connection of the second subscriber identity module if the message identification information of the page includes a core network domain that maps to one of an IMS, VoLTE, and SMS data gateway identifier that is identified as the predefined gateway identifier and the ongoing network connection is also packet switched.

Example 97 may include the mobile communications device of example 91, wherein the comparison includes: prompting the mobile communications device to control the ongoing network connection of the second subscriber identity module if the message identification information of the page includes a core network domain that maps to one of an IMS, VoLTE, and SMS data gateway identifier that is identified as the predefined gateway identifier and the ongoing network connection is circuit switched.

Example 98 may include the mobile communications device of example 52, 61, 62, 76, 86-91, and 93-96, wherein the page is for a first subscriber identity module.

Example 99 may include the mobile communications device of example 97, wherein the first subscriber identity module is a multi-radio access technology subscriber identity module.

Example 100 may include the mobile communications device of example 99, wherein one of the multi-radio access technologies for the first subscriber identity module is LTE.

Example 101 may include the mobile communications device of example 52-56, 60, 65-68, 73, 86-90, and 93-96, wherein the ongoing network connection is on a second subscriber identity module.

Example 102 may include the mobile communications device of example 100, wherein the second subscriber identity module is a 2G only subscriber identity module.

Example 103 may include the mobile communications device of example 100, wherein the ongoing network connection is an ongoing voice call.

Example 104 may include the mobile communications device of example 42, further including: a memory configured to: store the predefined gateway identifier.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A mobile communications device comprising a radio processing circuit and a baseband processing circuit adapted to interact with the radio processing circuit, the mobile communications device configured to:
   receive a page;
   obtain message identification information identifying a core network domain from the page;
   process the obtained message identification information by comparing the core network domain obtained from the page to a predefined list of core network domain types; and
   control an ongoing network connection resulting from the processed message identification information by suspending the ongoing network connection by creating an unscheduled gap, establishing a network communication control connection during the unscheduled gap, and releasing the network communication control connection and returning to an idle state when the core network domain is other than one of the stored core network domain types and is established with a packet switched core network domain.

2. The mobile communications device of claim 1, wherein the page is for a first subscriber identity module.

3. The mobile communications device of claim 2, wherein the first subscriber identity module is a multi-radio access technology subscriber identity module.

4. The mobile communications device of claim 1, wherein the ongoing network connection is on a second subscriber identity module.

5. The mobile communications device of claim 4, wherein the second subscriber identity module is a 2G only subscriber identity module.

6. The mobile communications device of claim 1, wherein the controlling of the ongoing network connection further comprises:
   reconfiguring the network communication control connection to receive session signaling.

7. The mobile communications device of claim 1, further comprising:
   receiving session signaling indicated in the page when the core network domain is one of the stored core network domain types and is established with an IMS (internet protocol multimedia subsystem) core network domain.

8. The mobile communications device of claim 7, further comprising:
   obtaining at least one of a caller identification and an SMS message from the session signaling.

9. The mobile communications device of claim 1, wherein the ongoing network connection is resumed when the unscheduled gap exceeds a predetermined amount of time.

10. The mobile communications device of claim 1, wherein the ongoing network connection is resumed following obtaining at least one of a caller identification and an SMS message.

11. The mobile communications device of claim 1, wherein the processing of the obtained message identification information comprises:
    arbitrating between communication resources for a first subscriber identity module and a second subscriber identity module.

12. The mobile communications device of claim 11, wherein the communication resources comprise at least one receiver and at least one transmitter.

13. The mobile communications device of claim 1, wherein the predefined list of core network domain types comprises at least one of a packet-switched core domain and/or an IMS (internet protocol multimedia subsystem) core network domain.

14. The mobile communications device of claim 1, wherein the processing the obtained message identification information further comprises:
    comparing the core network domain obtained from the page to a core network domain of the ongoing network connection.

15. A method for controlling a mobile communications device in response to a page comprising:
    receiving a page;
    obtaining message identification information identifying a core network domain from the page;
    processing the obtained message identification information by comparing the core network domain obtained from the page to a predefined list of core network domain types; and
    controlling an ongoing network connection resulting from the processed message identification information
    suspending the ongoing network connection by creating an unscheduled gap;
    establishing a network communication control connection during the unscheduled gap; and
    receiving session signaling indicated in the page when the core network domain is one of the stored core network domain types and is established with an IMS (internet protocol multimedia subsystem) core network domain or releasing the network communication control connection and returning to an idle state when the core network domain is other than one of the stored core network domain types and is established with a packet switched core network domain.

16. A mobile communications device comprising a radio processing circuit and a baseband processing circuit adapted to interact with the radio processing circuit, the mobile communications device configured to:
    receive a page;
    obtain message identification information identifying a core network domain from the page;
    process the obtained message identification information by comparing the core network domain obtained from the page to a predefined list of core network domain types; and control an ongoing network connection resulting from the processed message identification information by suspending the ongoing network connection by creating an unscheduled gap, establishing a network communication control connection during the unscheduled gap, and receiving session signaling indicated in the page when the core network domain is one of the stored core network domain types and is established with an IMS (internet protocol multimedia subsystem) core network domain.

17. The mobile communications device of claim 16, further comprising:

obtaining at least one of a caller identification and an SMS message from the session signaling.

* * * * *